Patented Mar. 6, 1923.

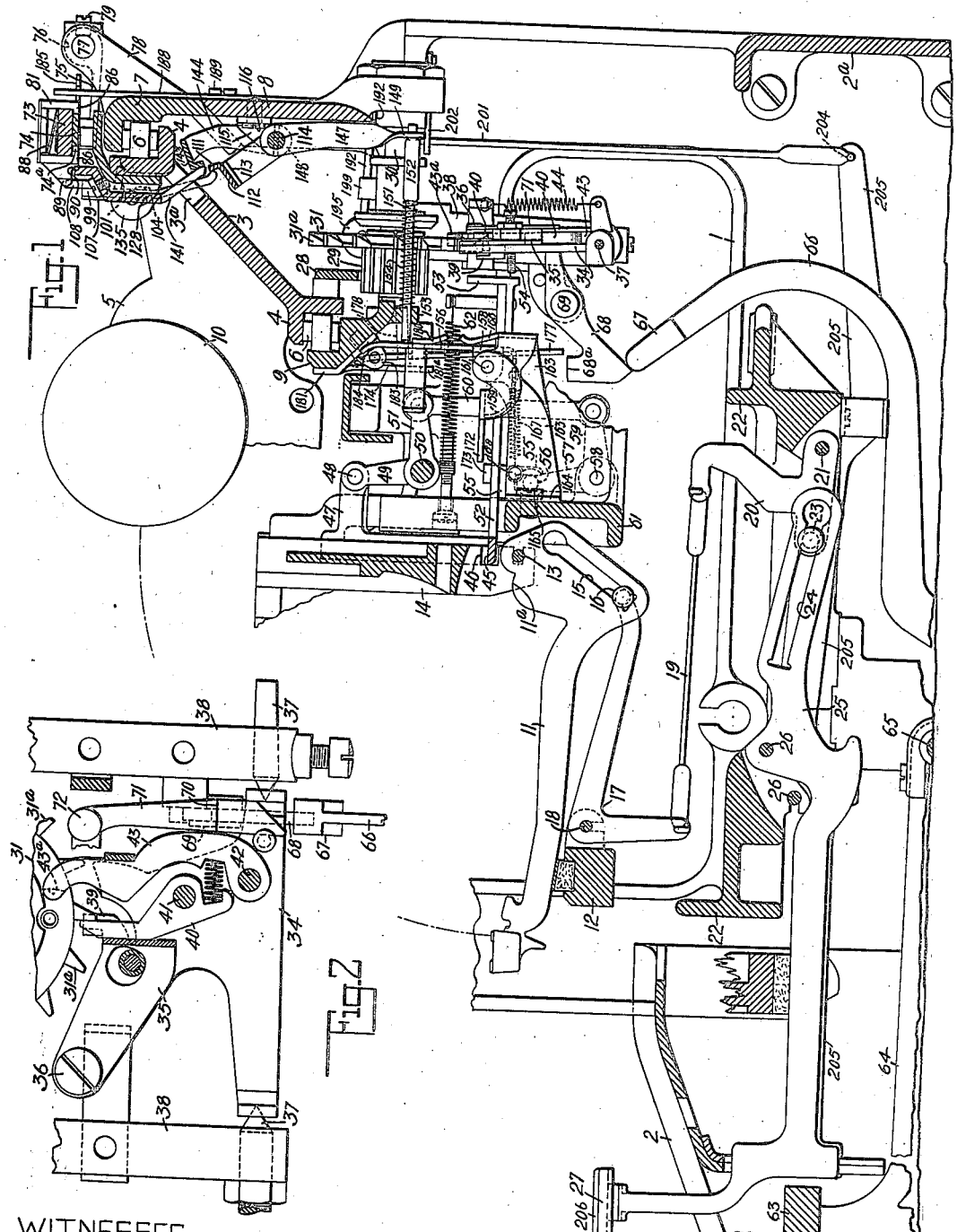

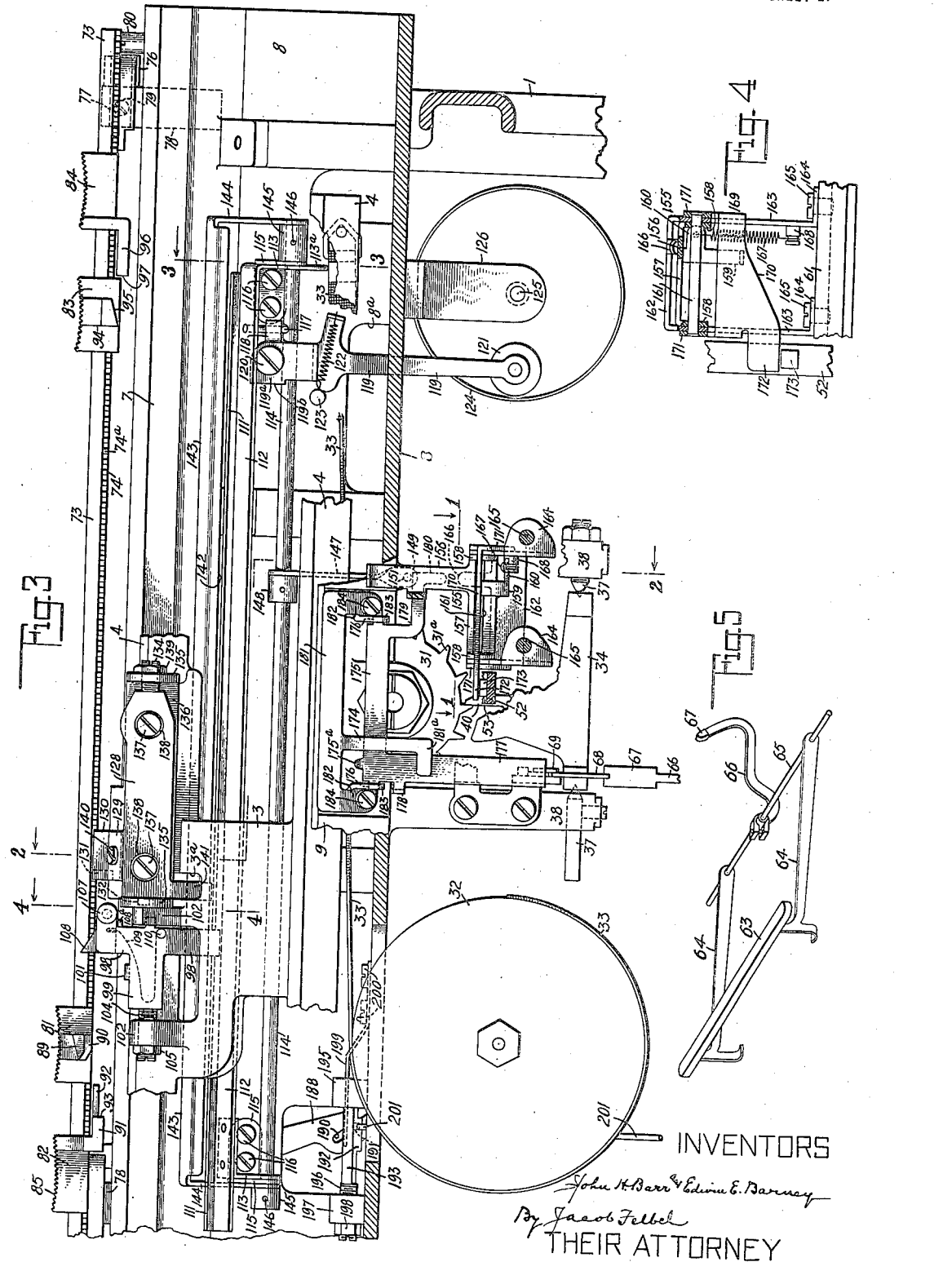

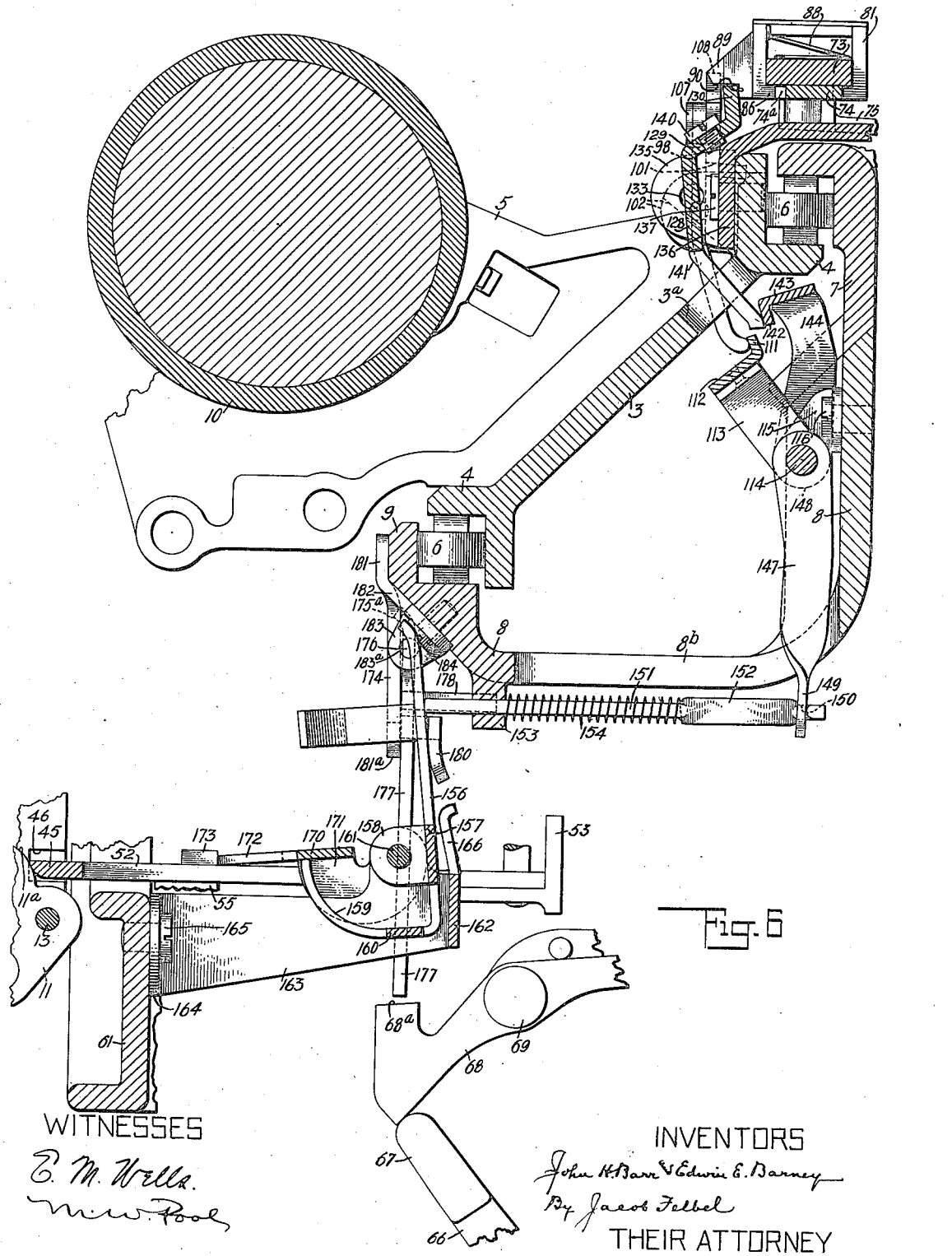

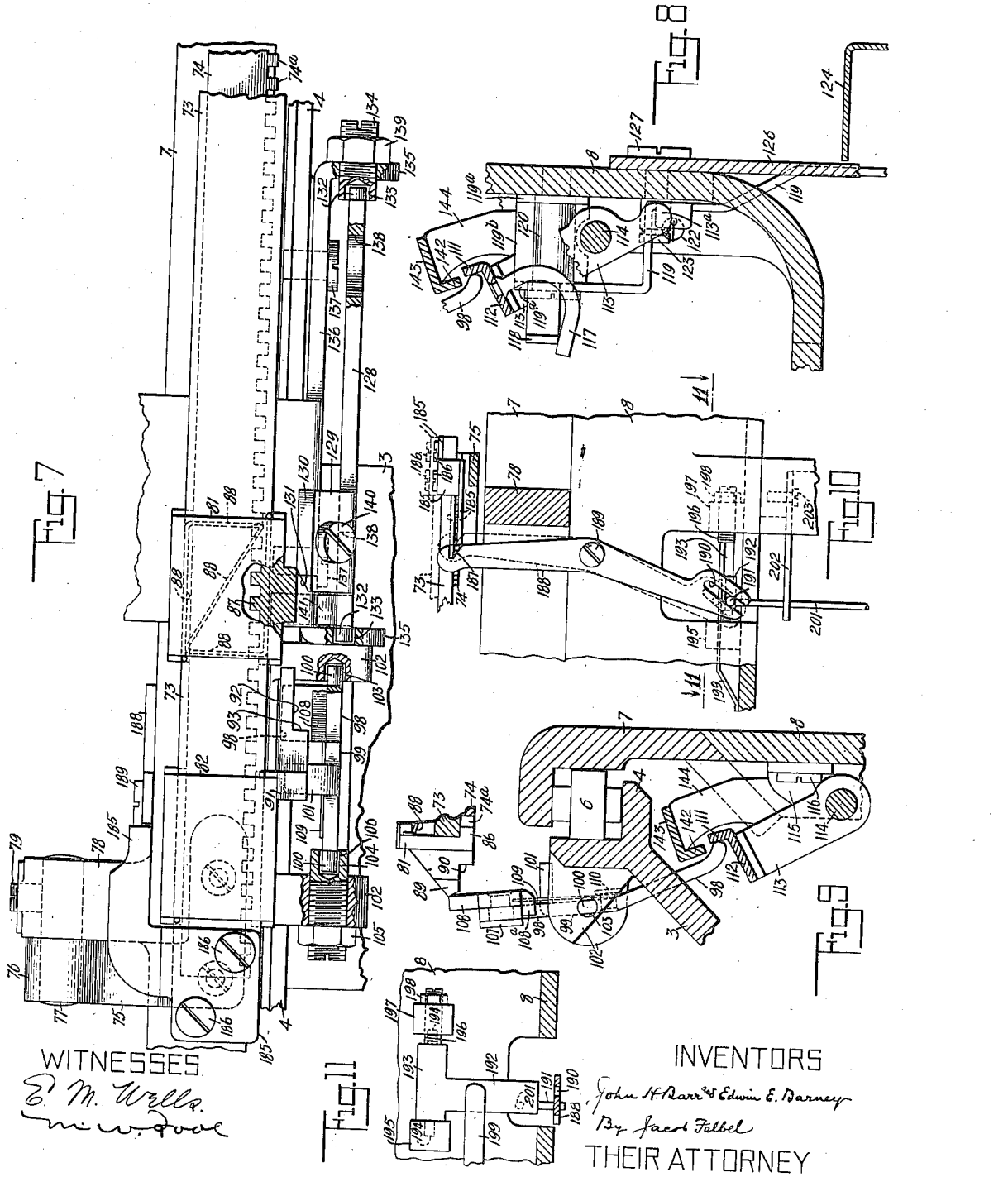

1,447,639

BEST AVAILABLE COPY

UNITED STATES PATENT OFFICE.

JOHN H. BARR, OF NEW YORK, AND EDWIN E. BARNEY, OF NEW ROCHELLE, NEW YORK, ASSIGNORS TO REMINGTON TYPEWRITER COMPANY, OF ILION, NEW YORK, A CORPORATION OF NEW YORK.

TYPEWRITING MACHINE.

Application filed October 7, 1921. Serial No. 506,107.

*To all whom it may concern:*

Be it known that we, JOHN H. BARR and EDWIN E. BARNEY, citizens of the United States, and residents of the borough of Manhattan, city, county, and State of New York, and New Rochelle, county of Westchester, and State of New York, respectively, have invented certain new and useful Improvements in Typewriting Machines, of which the following is a specification.

Our present invention relates to line lock and bell ringing mechanisms for typewriting machines and its chief object is to provide new and improved mechanisms of the character specified.

To the above and other ends which will hereinafter appear, our present invention consists in the features of construction, combinations of devices and arrangements of parts hereinafter described and particularly pointed out in the claims.

In the accompanying drawings, which illustrate the preferred form of our invention, Figure 1 is a fragmentary front to rear vertical sectional view of a typewriting machine embodying the invention, only so much of said machine being shown as is necessary to a clear understanding of said invention.

Figure 2 is a fragmentary rear elevation, partly in section, illustrating the escapement mechanism.

Figure 3 is a fragmentary rear elevation of the upper part of said machine.

Figure 4 is a fragmentary horizontal sectional view taken on a plane indicated by the dotted line 1—1 in Figure 3 and looking downward.

Figure 5 is a perspective view on a small scale of the space bar mechanism.

Figure 6 is a fragmentary vertical sectional view taken on planes indicated by the dotted line 2—2 in Figure 3 and looking in the direction of the arrows at said line, said Figure 6 showing some of the parts in operated position and being drawn to an enlarged scale.

Figure 7 is a fragmentary plan view on an enlarged scale of some of the parts of our novel mechanism.

Figures 8 and 9 are vertical sectional views taken respectively on planes indicated by the dotted lines 3—3 and 4—4 in Figure 3 and looking in the direction of the arrows at said line, Figures 8 and 9 being drawn to an enlarged scale and showing the parts as they appear just prior to the tripping of the bell mechanism.

Figures 10 and 11 are respectively a fragmentary rear elevation and a plan view of the line lock release and margin release mechanism.

Referring to Figs. 1 and 3, the main frame of the typewriting machine illustrated therein comprises side plates or frames 1 which are connected at the front by a U-shaped frame 2 that encloses the keyboard of the machine and at the rear by a cross plate 2ª to which both side frames are rigidly secured. Mounted above the main frame is a traveling carriage comprising an inclined perforated plate or webbed portion 3 provided at its top and bottom with grooved bars 4. To the ends of the plate or bar 3 are secured forwardly extending end plates 5. The grooved bars 4 provide seats or runways for sets of anti-friction rollers 6, the upper set co-operating with a grooved seat formed in a stationary guide bar 7 which extends crosswise of the machine and is rigidly secured to the upper end portion of a bed plate 8 fixedly mounted at the top and rear of the frame plates 1. The bed plate 8 has a forwardly extending horizontal portion terminating in an upward extension 9 formed with a grooved seat which receives the lower set of rollers 6. Journaled on the traveling carriage 3—5 is a roller platen 10 with whose front face co-operate type bars 11 which are horizontally disposed and supported on a padded rest 12, the type bars each carrying two types and being pivoted on a common pivot wire 13 mounted on a type bar support or segment 14. Each type bar is provided with an inclined slot 15 which is engaged by a pin 16, projecting from a bell crank 17 which is one of a set pivoted on a wire 18 mounted on the rest 12. Links 19 connect the bell cranks 17 with angular levers 20 pivoted at 21 in a sub-frame 22 which is detachably secured to the main frame. Each lever 20 carries a pin 23 which engages in a slot 24 formed in the rear of a key lever 25, the set of key levers extending forward and being pivoted on fulcrum wires 26 mounted in the sub-frame 22. Each key lever is provided with a key cap 27 and it will be understood that when one of the caps or printing keys 27 is depressed it will operate through the described train of devices to swing the connected type bar into printing contact with the platen 10 and paper thereon. Mounted on the carriage is a feed rack 28 which intermeshes with a feed pinion 29 supported on a horizontal shaft 30 which has bearings on the bed plate 8. Fixed to said shaft is an escapement wheel 31 provided with radial teeth 31$^a$ and which carries a pawl, not shown, that normally meshes with the feed pinion 29 so that feeding movements from the traveling carriage may be transmitted through the rack 28 and pinion 29 to the escapement wheel 31. The carriage is power-driven, being connected to a motor or spring drum 32 by a band or tape 33 in such a way that said carriage is constantly urged leftward. The escapement wheel 31 is detented or dogged so as to control the carriage movements, preferably by mechanism of the character disclosed and claimed in the pending application of A. W. Smith, Serial No. 476,788, filed June 11, 1921, the same comprising three dogs which are mounted on a two-part rocker that is vibrated when one of the printing keys is actuated, so that two of the dogs will co-operate with the escapement wheel to cause a no-drop letter feeding movement of the carriage during the return stroke of the actuated printing key. The third dog is only brought into use during the actuation of the space bar or key and causes a "reverse" or full drop feed of the carriage.

Referring to Figs. 1 to 3 it will be noted that said dog rocker comprises a main dog rocker part 34 and a secondary part 35 pivoted at 36 to the part 34. The dog rocker as a whole is provided with stationary pivots 37 which co-operate with depressions at the sides of the part 34, said pivots being supported on arms 38 depending from the bed plate 8, the construction enabling the rocker to be swung fore-and-aft of the machine and transversely of the escapement wheel. Rigid with the main rocker part 34 is a holding dog 39 which normally lies forward of the plane of the escapement wheel. A stepping dog 40 which normally engages with the lowermost of the teeth 31$^a$ of the escapement wheel is pivotally supported at 41 on the rocker part 35 to which is also pivoted at 42 the third dog 43 which is controlled from the space bar alone, the tooth or engaging portion 43$^a$ of said third dog normally standing above and out of contact with the underlying offset portions of the wheel teeth 31$^a$. It will be understood that while in Fig. 2 the rear or off-set portion of the plate or bar 35 is omitted for the sake of clearness, the dogs 40 and 43 are loosely confined between the parts 34 and 35 and are adapted to swing bodily with and on the part 35 about the center 36 independently of movement of the part 34, although all three dogs participate in the swinging movements of the rocker as a whole on the pivots 37. The two-part dog rocker is provided with a restoring spring 44 which maintains it normally in the Fig. 1 position and also holds the carrier parts in normal relationship with each other. Said rocker together with the parts carried by it is adapted to be swung on its pivots when the printing keys are actuated. In the present instance movement from the printing keys is transmitted to the dog rocker through contact faces 11$^a$ on the type bars, said contact faces co-operating with the front face of a curved universal bar 45, which is housed in a seat or depression 46 in the rear of the type bar segment 14. The universal bar 45 is part of a universal bar frame comprising rearward extensions 47 from the universal bar proper, said extensions being pivotally connected at 48 with crank arms 49 fixed to a shaft 50 from which said crank arms project upward, said shaft also being provided with a central rearwardly extending crank arm 51. The universal bar frame further comprises an arm 52 extending rearward from the lower middle portion of the universal bar and carrying a contact device 53 which is adapted to engage with the point of a contact screw 54 carried by the dog rocker. The contact 53 is of such height that its lower portion lies opposite the contact screw 54 in lower case position, while its upper position is brought opposite said contact screw when the parts are shifted for upper case, the construction being such that in both case positions the face 53 is adapted to engage with the screw 54. The arm 52 has a downwardly extending slotted lug 55 that is engaged by a pin 56 projecting laterally from a crank arm 57 fixed to an axle 58 which also carries a rearwardly extending crank arm 59. The crank arms 51 and 59 are connected by a link 60 which, together with said crank arms and the crank arms 49 and 57, synchronize the movements of the universal bar frame. The pivotal supports 50 and 58 of said frame are mounted on a bracket member 61 to which the type bar segment 14 is secured, both said segment and said bracket being subject to case shifting movements so that the universal bar at its front edge is always in position normally to receive actuations from the type bars. The universal bar frame is provided with a restoring spring 62 which normally maintains the universal bar in contact with the front wall of the depression 46. When one of the printing keys 27 is depressed it acts through the train of type bar actuating devices to swing the associate type bar to operative position, causing the contact face 11$^a$ of said type bar, acting against the curved universal bar 45, to move the universal bar frame rearward against the pull of its spring, the movement being transmitted through the contact screw 54 to the dog rocker 34, 35, which will be swung rearward from the Fig. 1 position, causing the stepping dog 40 to disengage from the escapement wheel tooth 31$^a$ and swing on its pivot 41 behind said tooth, and causing the holding dog 39 to engage with said wheel tooth, so that when the actuated key 27 is released and the parts return to normal position the carriage will be permitted to step one letter space toward the left under the pull of its motor or spring drum 32, all as more fully described and explained in the Arthur W. Smith application aforesaid.

The escapement is adapted to be actuated from the space key or bar 63 of the machine without affecting the main dog rocker part 34. Said space bar, as appears from Figs. 1 and 5, is carried by a pair of lever arms 64 which extend forward from a rock shaft 65 having stationary bearings. Projecting rearward from said rock shaft is a curved arm 66 terminating in a head 67 which normally underlies the forward arm of a lever 68 mounted on a stationary pivot 69, the rearwardly extending arm of said lever being adapted to contact with a shoulder 70 formed on an arm 71 pivotally connected at 72 to the secondary carrier part 35. The construction is such that when the space key is depressed the curved arm 66 will be swung upward, causing the head 67 to actuate the lever 68, the rear arm of said lever co-operating with the shoulder 70 to swing down the secondary carrier part 35 on its pivot 36 on the main rocker part 34. The downswing of said carrier part 35 causes the stepping dog 40 to disengage from the escapement wheel and brings the tooth 43$^a$ of the third dog 43 down into engagement therewith, it being understood that the teeth 31$^a$ are off-set or project rearward sufficiently to provide engaging surfaces for the dog tooth 43$^a$. The construction is such that an escapement movement is thus effected during the depression of the space bar, the spacing of the carriage taking place prior to the beginning of the return of the parts to normal position following the release of said space bar.

Our novel line lock mechanism comprises gravity operated abutments or stops which move automatically from inoperative to operative positions, preventing respectively the actuation of the type bar operated universal bar and of the space bar. The gravity operated devices are normally held out of operation by preventive means and their automatic movement takes place at the end of the line of writing and is controlled by co-operating stop devices or contacts, one on the frame and one on the carriage, which move the preventive means out of action and allow gravity to set the stops. The frame contact device is adjustable to vary the length of the writing line and the carriage carried contact device is in effect a pivoted cam, which while permitting the universal bar stop and the space bar stop to move into place does not directly arrest the carriage, further writing being prevented by the locking of the printing keys and space bar against operation. A key actuated line lock release mechanism may then be operated to release or separate the contacts, permitting writing of additional characters in the line, as is usual, a second or final contact adjustable on the frame of the machine next co-operating with the contact device on the carriage to lock the printing keys and space bar from operation as before. The final contact device also is provided with a carriage stop which positively limits movement of the carriage in printing direction. Two adjustable stops or contacts are also mounted on the frame to co-operate with the carriage contact to positively arrest the carriage during its return movement, the line lock release key also serving as a margin release key to move the first of these last mentioned frame stops to inoperative position, permitting the carriage to be returned a further distance until finally arrested. Preliminary warning of the approaching end of the line of writing is given by a bell mechanism of novel construction.

The frame stops or contact devices, as appears from Figs. 1, 3 and 7, are mounted on a rectangular stop bar 73 which is arranged above the top of the guide bar 7. The under side of the stop bar 73 is provided with a series of forwardly extending rack teeth which may be formed integrally with the bar 73 but for convenience of construction are preferably cut in a separate toothed piece or rack 74 which is suitably secured to the bar 73 as by riveting. The rack 74 is formed with rectangular or square teeth 74$^a$ along its forward edge and said rack is somewhat narrower than the bar 73 so that the front and back under-edge portions of said bar project beyond the rack, the two pieces 73 and 74 providing in effect an undercut rack bar. Screwed to the end portions of the rack bar 73, 74 are rearwardly extending arms 75 provided with eyes 76 which receive pivot pins 77 extending laterally outward from ears 78 on the bar 7, said pivot pins being adjustably secured in said ears by set screws 79. The construction provides a pivotal mounting for the rack or stop bar 73, 74 the normal position whereof is determined by a stop pin 80 projecting upward from the bar 7 and on which the right-hand end portion of the bar 73 normally rests. The bar may be thrown back by hand from this position on its pivots 77. Adjustably supported on the bar 73, 74 are a plurality of stop or contact devices, there being four of said devices in the present instance numbered 81, 82, 83 and 84. These devices are generally alike in construction, differing chiefly in respect to their contact portions. Each device fits loosely on the stop bar and its top is concaved and roughened as indicated at 85 to provide a convenient hold for the finger of the operator, thus facilitating adjustment. The under side of each stop device is cut away to provide gibs or lip portions 86 that contact with the under side of the bar 73 where it projects beyond the front and back edges of the rack 74. The front lip portion of each stop device is toothed, as indicated at 87, to correspond with the rack teeth 74$^a$. Each stop device carries a spring 88 of wire bent to a Z-shape and which is arranged under the roughened top portion of the stop and has its ends co-operating with the sides of said top portion so as to prevent displacement of the spring which, when the stop device is in place on its support, is interposed between the top of the bar 73 and the bottom face of the roughened top portion of the stop device. The Z-spring, while comparatively cheap, is highly effective, so distributing its pressure over the under side of the stop face as to prevent looseness or wobbling of the stop. Also the construction is such that the rounded portions only of the spring contact with the upper face of the stop bar will not scratch or mar it when the stop is slid along it. The spring tension is upward and tends constantly to hold the stop devices up in the position illustrated in Fig. 1, maintaining the teeth 87 engaged with the rack teeth 74$^a$, thus fixing the stop on is support. By pressing down on the stop its spring may be overcome and the teeth 87 forced down out of the rack bar, thus enabling the operator to adjust the stop to any desired position along the stop support or bar. The top of the bar 73 is preferably formed with a scale to facilitate the proper adjustment of the stop devices. The stop devices 81 and 82 are arranged at the left-hand side of the machine and the stop devices 83 and 84 are arranged at the right-hand side. The device 81 is provided with means for actuating the bell mechanism and operating the line lock mechanism, while the device 82 constitutes the final line lock and margin stop. The devices 83 and 84 at the right constitute respectively the first and final margin stops. The device 81 has a forwardly projecting lug which is formed with an inclined or cam face 89 and is undercut to provide a contact face 90. The device 82 has a rightward extension 91 formed with a contact face 92 terminating at its left in a final stop face 93. The device 83 has a forwardly projecting lug formed with a stop face 94 and an underlying cam face 95; while the device 84 is provided with a leftward extension 96 terminating in a final stop face 97.

The bell mechanism illustrated in Figs. 1, 3 and 6–9 comprises a lever member having a vertically disposed portion 98 and a horizontally disposed portion 99. The latter terminates in pintles or bearing lugs 100 and has bent rearward from its upper edge a horizontal stop lug 101. The pintles 100 bear in ears or lugs 102 projecting from the upper carriage bar 4. The right-hand lug 102 is formed with a bearing opening indicated at 103 in which the associate pintle 100 directly engages. The left-hand ear 102 is formed with a tapped opening in which is threaded a screw bearing 104 which is provided with a locking nut 105 and is formed at its inner end with a bearing opening indicated at 106 in which the left-hand pintle 100 engages. There are thus provided relatively adjustable bearings for the lever member 98, 99. The upper end of the portion or arm 98 is slightly off-set rightward and has pivoted to it at 107 a trip 108 having at its free end vertical and cam edges which meet above the top of the portion 98. A wire spring 109 secured to a pin 110 at the back of the lever member co-operates with the trip piece 108 to maintain it in normal position where it may co-operate with the cam 89 on the contact device 81, said cam and said piece 108 constituting co-operating bell trip devices. A stop lug 108$^a$ extends from the trip piece 108 under the off-set portion of the arm 98 and acts as a stop to limit the upward movement of the trip piece 108 under the impulse of the spring. The lower part of the arm 98 provides a finger which co-operates with an angularly bent edge or lip 111 of a cross bar 112 which is part of a bail member formed by riveting or otherwise securing to the end portions of said cross bar angle pieces 113, the downwardly extending portions whereof form the side arms of the bail, which portions are perforated and bear on a rod or shaft 114 which bears in angular brackets 115 secured by screws 116 to the front of the vertical wall of the bed plate 8. The cross portion 112 of the bail extends lengthwise of the bed plate and is of sufficient length to enable the lower end portion or finger of the lever member 98, 99 to engage with it at any point in the carriage travel. The bail is disposed behind the carriage and tends to fall forward of its own weight, this forward movement being limited by a downward extension 113ª of the right-hand bracket 113, said extension normally contacting with the bed plate 8 and serving to stop the bail. Extending downward from the cross bar 112 near its right-hand end is a hook 117 whose free end underlies a lug 118 off-set from an arm 119, said arm and said offset constituting an angular lever which is pivoted near its upper end to a screw pivot 120 projecting from the bed plate 8. The exposed or bearing portion of the screw 120 is shouldered and the upper end of the lever member 118, 119 is shaped to provide two parallel bearing ears 119ª connected by a fore-and-aft cross portion 119ᵇ, said ears being perforated to bear on and near the ends of the shouldered portion of the screw 120. From its bearing portion the arm 119 extends downward, passing through a perforation 8ª in the bed plate and being bent or off-set so that its lower end portion is behind said bed plate. The arm 119, is provided at its lower end with a circular head 121, the head, the arm and its offset 118 constituting a bell hammer. A coiled spring 122 anchored to a pin 123 on the bed plate is connected to the bell hammer and constantly tends to swing its head leftward about the pivot 120. Said head lies within and is adapted to co-operate with the rim of a circular cup-shaped bell 124 which is supported at 125 to the lower end of an arm 126 fixed to the back of the bed plate 8 by screws 127. The spring 122 normally maintains a rounded portion of the arm 119 in contact with the pin 123, holding the bell head 121 very slightly separated from the rim of the bell 124. When the carriage moves leftward, the trip 108 engages with the cam 89 and swings the lever member 98, 99 on its pivots, the lower end of said lever member acting against the lip 111, swinging the bell from the Fig. 8 to the Fig. 9 position. This movement causes the hook 117 to lift the lug 118, swinging the bell hammer 119 on its pivot against the spring 122 and moving the head 121 away from the bell rim, so that when the bell trip passes and is released by the cam edge 89, permitting the bell ringing mechanism or train to be restored to normal position through the combined action of gravity and the restoring spring 122, the momentum or impetus will cause the bell head 121 to strike the bell and ring it, giving warning of the approaching end of the line. During the return movement of the carriage the trip piece 108 will be cammed downward about its pivot 107 by reason of the engagement of the cam edge on said trip piece with the lug of the contact device 81, and will not otherwise affect the bell ringing mechanism. The trip piece 108 is out of line with the other contact devices or stops on the frame of the machine and will not be affected by any of them.

The line lock mechanism proper next to be described comprises a carriage carried contact or cam device numbered 128, which co-operates with the stop members mounted on the bar 73, 74, and is illustrated in Figs. 1, 3, 6 and 7. From the top of the body or cross bar of the device 128 there is rearwardly bent a lug 129 terminating in an upright portion 130, the back of which is beveled at its left-hand side to provide a cam face 131. The ends of the body portion of the device 128 are provided with bearing lugs or pintles 132 which engage in bearing openings indicated at 133 of which the right-hand one is formed in the inner end of a screw pivot 134 threaded into the right-hand one of a pair of parallel ears 135 of a bracket 136 secured by screws 137 to the upper carriage bar 4. The left-hand bearing opening 133 is formed directly in the left-hand ear 135. Circular holes indicated at 138 formed in the device 128 afford access to the screws 137. A check nut 139 holds the screw bearing 134 in adjusted position, the construction affording relatively adjustable bearings for the cam member. Said cam member is hung loosely on its bearings and gravity tends normally to maintain an adjustable screw stop 140 which projects downward through the part 129 in contact with the bracket 136, thus determining the normal position of the cam face 131, and maintaining it in line with the co-operating faces on the frame stops. An integral finger 141 projects downward and rearward from the body of the cam device 128 through an opening indicated at 3ª in the web portion 3 of the carriage. The lower end of said finger 141 is adapted to co-operate with the downturned front edge or lip 142 of a cross bar 143 which at its ends terminates in downwardly extending parallel arms 144 provided with hubs 145 secured by pins 146 to the projecting outer ends of the rod or rock shaft 114. The bail constituted by the cross bar 143 and the arms 144 is nested with the bail 112, 113, providing a compact construction, the bails being co-axial, the outer bail being fixed to the shaft 114 and the inner bail 112, 113 being loosely pivoted thereon. Fixed about centrally to the rock shaft 114 is a downwardly extending arm 147, the upper end of which is provided with a hub 148 which fits over the rock shaft and is pinned thereto. The lower end of the arm 147 projects through the central opening 8ᵇ in the bed plate 8 and is turned or twisted to provide a flat transverse end 149 which is formed with a perforation indicated at 150. Engaging with this perforation is the cylindrical rear end of a rod or slide 151, which is formed near its rear with an enlarged flat portion 152, the round front end portion of said rod bearing slidably in a lug 153 depending from the bed plate 8. A wire spring 154 is coiled around the rod between the lug 153 and the flat portion 152 and re-acts to constantly press the rod rearward, maintaining the rear end of the flat portion 152 in contact with the lower end 149 of the arm 147. It will be observed that the crank arm 147, rock shaft 114 and bail 142—144 together constitute a rocking frame, the cross bar 142, 143 of said bail being of such length that the finger 141 may co-operate with it in all positions of the carriage travel to swing the frame on its axis so that the bar 143 is moved rearward and the crank arm 147 is swung forward. The front end of the slide 151 co-operates with a controlling member or stop preventer designated as a whole by the numeral 155, said member being preferably a single piece or sheet metal frame comprising an upright arm 156 rising from a horizontal cross portion 157 which terminates in forwardly bent ears 158. Extending forward from the under side of the cross portion 157 is a finger or engaging portion 159 which curves upward at its front end, said portion 159 being provided with a laterally extending lug 160. The ears 158 are perforated to bear on a rod 161 which is supported on a U-shaped bracket comprising a horizontal cross bar 162 from the ends of which extend forward parallel arms 163 terminating in angularly disposed ears 164 which receive headed screws 165 that are threaded into the member 61, thus securing the U-shaped bracket thereto. The side arms 163 of said bracket are provided with bearing openings which receive the rod 161, and the cross bar 162 is provided with an upward extension or finger 166 which acts as a stop for the member 155. The rear portion of said member is normally maintained in contact with the extension or stop finger 166 by a coiled spring 167 which is anchored at its front end to a pin 168 projecting laterally from the right-hand arm 163, the rear end of said spring being hooked through a hole in the lug 160. When thus maintained in normal position the finger or engaging portion 159 of the controlling member or stop preventer sustains a pivotally mounted, gravity operated abutment or stop for the universal bar in inoperative position. In the present instance said stop, designated as a whole by the numeral 169, is in the form of a U-shaped frame of sheet metal comprising a cross portion 170 extending above and transversely of the bracket arms 163 and provided at its ends with downwardly extending side portions or arms 171 which loosely embrace the bracket arms 163 and are perforated to bear on the rod or shaft 161, the ends of said shaft being spread or upset to prevent accidental displacement. Offset forward and leftward from the body portion 170 is an extension 172 which provides an abutment or stop proper, the forward edge of which is adapted for co-operation with a lug 173 projecting upward from the arm 52 of the universal bar frame. Said abutment is normally maintained up out of the path of said lug but when released by the controlling frame 155 drops down through the force of gravity close behind the lug 173 so as substantially to prevent movement thereof, the abutment 172 and lug 173 constituting co-operative stops to lock the universal bar against movement and the printing keys from co-operation with the platen, thus locking the line. The normal or inoperative position of the stop member 169 is shown in Fig. 1, and its operative position in Fig. 6, and it will be understood that when the slide 151 is pressed forward by the crank arm 147 under impulse of the finger 141, said slide will swing the member 155 on its pivot 161, overcoming the spring 167, lowering the finger 159, and permitting the stop 173 to drop from the Fig. 1 to the Fig. 6 position.

The controlling frame 155 also controls the operation of a gravity operated stop device for the space bar mechanism, said device in the present instance being in the form of a sheet metal frame or member 174 comprising a cross portion 175 provided at its ends with bearing lugs or pintles 176 and having at its left-hand end a downward extension or finger 177, said finger being provided with an off-set lug 78 which acts as a stop (Figs. 1, 3 and 6). At its right-hand end the cross portion 175 is provided with an angular extension 179 terminating in an upright curved head 180 which lies behind and contiguous to the arm 156 of the preventer or controller 155. The stop member 174 is hung or suspended from a bracket member comprising a cross portion 181 terminating in downward extensions 182 provided at their inner sides with rearwardly bent perforated ears 183, said bracket member being secured by headed screws 184 to the front side of the bed plate extension 9. The perforations in the ears 183 indicated at 183ª provide bearings for the pintles or lugs 176 of the stop member 174, said member being suspended or hung from said lugs and being normally held back in the Fig. 1 position by the arm 156 acting against the head 180. The stop lug 178 prevents undue backward movement of the member 174, said stop lug 178 being adapted to contact with the under face of the bed plate 8. In Fig. 1 it will be observed that the lower end of the stop finger 177 lies out of the path of the lever 68 in the space bar train so that the stop member 174 does not interfere with the operation of said train. When, however, the controller 155 is actuated by the slide 151 the arm 156 will swing forward, releasing the member 174, which will swing forward under the influence of gravity to the Fig. 6 position, the finger 177 then lying in the path of the lever 68, said lever being provided with a stop face 68$^a$ which is adapted to contact with the end of the finger 177. Undue forward movement of the stop member 177 may be prevented by an angular stop finger 181$^a$ extending from the cross portion or bar 181 into the path of the finger 177. An alternative stop may be provided in the form of a lug 175$^a$ projecting from the top of the cross bar 175 and adapted to contact with the bed plate extension 9.

From what has been said it will be understood that during the leftward travel of the carriage after the trip piece 108 has co-operated with the cam 89 on the contact 81 to actuate the bell mechanism, the cam face 131 on the carriage-carried cam device 128 will engage with the contact face 90, the parts co-operating to swing the member 128 on its pivots, causing the finger 141 to actuate the bail 143, 144, rocking the shaft 114 and causing the crank arm 147 fixed thereto to push forward the slide 151. Said slide, as has been explained, will turn the controller 155 on its pivot, thereby effecting the release of the two gravity controlled line stop members, the stop proper 172 dropping to co-operate with the stop 173 to block the universal bar and the stop finger 177 swinging over to co-operate with the lever 68 to block the space bar 63, the result being that no type bar can print and that the escapement mechanism cannot be actuated by either a printing key or by the space bar. Line lock release mechanism hereinafter described is provided for lifting the supporting bar 73, 74 on its pivots, freeing the cam member 128 from the contact face 90 which will be lifted out of operation, thus permitting the cam member to swing back in normal position with the result that the train comprising the rocking frame and its crank arm 147, the slide 151 and the controller 155 will be restored to normal position, the controller overcoming the force of gravity and moving the universal bar stop member and the space stop member back from the Fig. 6 to the Fig. 1 position. The lifted bar 73, 74 will drop back when the release key is released, but the cam member 128 having swung back to normal will not be affected by the contact face 90. As a consequence of the releasing operation, additional characters may be printed in the line of writing, the letter spacing movement of the carriage under the actuation of the escapement continuing also, until the cam face 131 engages with the contact face 92 on the contact device 82. As a result of such engagement, the line lock mechanism will again be actuated, the universal bar and the space bar being locked against operation as before. Further, the stop face 93 will co-operate with the left-hand edge of the part 130 to prevent further leftward movement of the carriage. This is the final stop since it is impossible by the line lock release mechanism to lift the bar 73, 74 far enough to carry the faces 92 and 93 out of operative position.

During the return movement of the carriage the left-hand margin will ordinarily be determined by contact of the right-hand face of the part 130 with the stop face 94 on the contact device 83. However, should it be desired to narrow the left-hand margin, the bar 73, 74 may be swung upward on its pivots far enough to carry the stop face 94 out of operative position and to permit further rightward or return movement of the carriage until it is arrested by contact of the part 130 with the final margin stop face 97 on the contact device 84.

The preferred form of line lock release and margin stop release mechanism is illustrated in Figs. 1, 3, 7, 10 and 11, said mechanism being controlled by a single key in the keyboard and comprising a finger or extension 185 secured by screws 186 to the left-hand end portion of the bar 73, said finger extending behind said bar and having its free end adapted to engage with a cam device or slot indicated at 187 formed in the upper arm of a lever 188 pivoted at 189 to the rear face of the bed plate 8. The lower arm of said lever 188 is also formed with a cam device or slot indicated at 190, which slot co-operates with a pin 191 projecting horizontally rearward from the arm 192 of an angular member which further comprises a cross arm 193 provided at its ends with pintles 194. The right-hand pintle bears in a lug 195 rising from the bed plate 8, and the left-hand pintle bears in an opening in a screw 196 threaded into a similar lug 197 rising from the bed plate 8. The screw bearing 196 is maintained in adjusted position by a locking nut 198. Overlying the arm 192 is a leaf spring 199 secured by screws 200 to the bed plate 8, said spring tending constantly to press the member 192, 193 downward on its pivots. Adapted to engage with the bottom of said arm 192 is a vertically arranged push rod 201 which near its upper end is guided by a horizontal plate 202 formed with a hole through which said rod 201 is adapted to slide, said plate 202 being screwed at 203 to the frame of the machine. The lower end of the slide or push rod 201 is pivotally connected at 204 to a key lever 205 which is pivoted on the fulcrum wire 21 on the sub-frame 22 and extends forward at the left-hand side of the keyboard, being provided at its front end with a key or button 206 for releasing line lock and margin stops. On pressing the key 206 the lever 205 is actuated to slide the rod 201 upward in its guide, causing its upper end, which is contiguous to the arm 192, to swing the member 192, 193 upward on its pivots against the spring 199 and lifting the pin 191. The upward movement of the pin 191 is transmitted through the cam slot 190 to the lever 188, swinging said lever on its pivots to the dotted line position in Fig. 10, this movement of the lever 188 causing the cam 187 near its upper end to push upward against the finger 185, thereby swinging the stop bar 73, 74 on its pivots 77 so as to raise the contact devices 81 and 83 above their operative plane. In other words, after the first line locking operation effected by the contact face 90, the key 206 is effective to release the line lock and permit further characters to be printed in the line. Also, said key is effective to release the carriage, after it has been arrested during its return movement by the stop face 94, to move said face out of operative position, permitting a further return movement of the carriage until finally arrested by the stop face 97. It will be noted that the construction provides means for preventing overthrow of the stop bar by the key. When the releasing mechanism is in normal position the upper end of the lever 188 stands at one side and out of the path of the inner end of the finger 185 so that said lever will not interfere with the movement of the stop bar 73—74 when the latter is thrown back by hand on its pivots. As soon, however, as the operator starts to depress the release key 206 the cam slot 187 will co-operate with the finger 185, the lower or inclined edge of said slot camming the finger upward and moving the stop bar upward to a corresponding extent, while the upper face or wall of said slot 187 which is horizontal will prevent undue movement of the finger and stop bar. The construction is such that a sharp blow on the release key cannot overthrow the stop bar or move it up to an excessive extent for the reason that as soon as the depression of the key begins, the stop bar, although normally disconnected from it, will be brought within the control of and connected with the key by the slot 187 and the lever 188.

Various changes may be made without departing from our invention.

What we claim as new and desire to secure by Letters Patent, is:—

1. In stop mechanism for typewriting machines, the combination of a rectangular stop bar having a narrower rack secured to its underside, a stop permanently mounted on said stop bar and provided with a stop opening loosely embracing the bar, said opening having a mouth corresponding in width to the rack at the under side of the stop bar, one side of said mouth being provided with teeth, and a wire spring constantly pressing the stop up to maintain it in engagement with said rack.

2. In combination with a pivotally mounted stop bar, a line stop thereon, and a co-operating stop, of key operated line lock release mechanism normally disconnected from said stop bar but adapted to swing it on its pivots, said mechanism including devices for preventing overthrow of said stop bar when actuated by said key.

3. In a typewriting machine, the combination of a pivotally mounted stop bar, a stop thereon, a co-operating stop, and a train of key operated devices for moving said stop bar on its pivots, said train being normally disconnected from said stop bar.

4. In a typewriting machine, the combination of a pivotally mounted stop bar, a stop thereon, a co-operating stop, and a train of key operated devices for moving said stop bar on its pivots, said train comprising a member provided with a cam slot normally disconnected from said stop bar but engageable with a projection thereon when the key is actuated.

5. In a typewriting machine, the combination of a pivotally mounted stop bar, a stop thereon, a co-operating stop, a horizontal finger rigid with said stop bar, and a key operated release lever provided with a slot normally disconnected from said finger but engageable therewith when said lever is actuated, the upper edge of said slot being horizontally disposed and the lower edge being inclined and acting as a cam on said finger to lift said stop bar.

6. In a typewriting machine, the combination of a traveling carriage, a lever on said carriage, a stationary bell trip device on the framework with which said lever co-operates, a bail on the frame of the machine with which said lever on the carriage co-operates, a hook on said bail, and a bell ringer liftable by said hook.

7. In a typewriting machine, the combination of a traveling carriage, a stationary cam, a lever pivoted on said carriage and operative by said cam, a bail mounted on the frame of the machine and provided with a hook, said bail being operative by said lever, an angular bell ringer having a stationary pivot and controlled by said hook, and a bell.

8. In a typewriting machine, the combination of a traveling carriage, a stationary cam, a lever pivoted on said carriage, a spring mounted trip on said lever co-operative with said cam, a bail mounted on the frame of the machine and controlled by said lever, an angular bell ringing lever operative by said bail, and a bell.

9. In a typewriting machine, the combination of a traveling carriage, a stationary trip device, a carriage carried trip device, a gravity bail pivoted on the frame of the machine, an angular spring mounted lever, connections between said lever and said bail, a hammer on said lever, and a bell.

10. In bell ringing and line lock mechanism for typewriting machines, the combination of two nested bails, one in the bell ringing train and the other in the line lock train, said bails being adapted to be successively operated.

11. In bell ringing and line lock mechanism for typewriting machines, the combination of two nested bails, one in the bell ringing train and the other in the line lock train, relatively adjustable contact devices, and a single cam for successively operating said bails.

12. In bell ringing and line lock mechanism for typewriting machines, the combination of two nested bails, one in the bell ringing train and the other in the line lock train, a single cam, and a pair of lever members adapted to be successively actuated by said cam, one lever member being operatively connected with the bell ringing bail and the other lever member with the line lock bail.

13. In bell ringing and line lock mechanism for typewriting machines, the combination of two nested bails, one in the bell ringing train and the other in the line lock train, a stationary actuating device, and a pair of lever members mounted on the traveling carriage of the machine, said actuating device being effective to successively actuate said lever members and said bails.

14. In line lock mechanism for typewriting machines, the combination of a universal bar, a lock constantly tending to move into the path of said universal bar, means normally preventing said lock from so moving, and devices for rendering said means inoperative, said devices comprising a contact device on the framework, a contact device pivoted on the carriage and having a downwardly extending finger, and a pivoted bail to be rocked by said finger.

15. In line lock mechanism for typewriting machines, the combination of a universal bar, a pivoted lock therefor, preventive means normally acting to hold said lock out of operation, said means comprising a controlling device pivoted co-axially with said lock, a line stop, and devices controlled by said line stop for overcoming said preventive means.

16. In line lock mechanism for typewriting machines, the combination of a carriage, a universal bar, a pivoted lock therefor tending constantly to turn on its pivot to locking position, a pivoted lock preventer normally holding said lock out of operative position, a pivoted engaging device on the carriage, a stop bar on the frame of the machine, a device on said stop bar to vibrate the pivoted engaging device on the carriage, and operative connections between said engaging device and said lock preventer, said connections comprising a pivoted bail and a spring pressed slide.

17. In line lock mechanism for typewriting machines, the combination of a universal bar frame, an abutment rigid therewith, a pivotally mounted co-operative abutment, a spring pressed frame normally maintaining said co-operative abutment in inoperative position, a separate spring pressed slide adapted to co-operate with said frame, a second frame pivoted on the machine frame and operative on said slide, a pivoted carriage stop operative on said second frame, and a device adjustable on the frame of the machine and operative on said carriage stop.

18. In line lock mechanism for typewriting machines, the combination of a universal bar, a gravity operated lock therefor, preventive means normally overcoming said lock, a carriage-carried line stop, a co-operating frame stop, and controlling connections between said carriage carried stop and said preventive means, said connections comprising a bail having stationary pivotal supports and extending lengthwise of the carriage and a crank arm coaxial with said bail.

19. In line lock mechanism for typewriting machines, the combination of a universal bar, a gravity operated lock therefor, pivoted preventive means normally overcoming said lock, a carriage carried line stop, a co-operating frame stop, and controlling connections between said carriage carried stop and said preventive means, said connections comprising a bail having stationary pivotal supports and extending lengthwise of the carriage, a crank arm coaxial with said bail, and a spring pressed slide rod between said pivotal preventive means and said crank arm.

20. In a typewriting machine, the combination of a traveling carriage; a universal bar frame provided with an abutment; key actuated type bars operative on said frame; and line lock mechanism comprising a stop normally maintained out of the path of said abutment, a pair of relatively adjustable actuating devices on the machine frame, a device on the carriage successively co-operative with said actuating devices, and means controlled by said carriage carried device to free said stop so that it may move into the path of said abutment to lock the type bars against actuation without arresting the carriage, the other of said actuating devices being effective both to operate the line lock mechanism and arrest the carriage.

21. In a typewriting machine, the combination of escapement mechanism, a universal bar adapted to actuate said mechanism, printing key levers effective on said universal bar, a bracket detachably mounted on the frame of the machine, a stop for the universal bar loosely pivoted on said bracket, a frame also pivoted on said bracket and having an extension engageable with said stop, a spring effective on said frame to overcome said stop, and devices comprising a contact on the traveling carriage of the machine for overcoming said spring and rendering said pivoted frame ineffective.

22. In a typewriting machine, the combination of escapement mechanism, a universal bar adapted to actuate said mechanism, printing keys effective on said universal bar, a space bar, connections independent of said universal bar between said space bar and said escapement mechanism, a bracket detachably mounted on the frame of the machine, a stop for the universal bar loosely pivoted on said bracket, a spring pressed frame also pivoted on said bracket and having an extension engageable with said stop, a stop for said space bar connections loosely hung on stationary supports, said pivoted frame being provided with a second extension for holding said space bar stop out of operation, and devices comprising a contact on the traveling carriage of the machine for rendering said pivoted frame ineffective on both of said stops.

23. In line lock mechanism for typewriting machines, the combination of escapement mechanism, a universal bar frame adapted to actuate said mechanism, printing keys effective on said universal bar frame, a space bar, connections independent of said universal bar between said space bar and said escapement mechanism, a lock constantly tending to move into the path of a part of said universal bar frame, a second lock constantly tending to move into position to block said connections, separate means normally preventing both said locks from moving to effective position, and devices comprising a line stop on the traveling carriage of the machine for throwing said separate means out of action.

24. In line lock mechanism for typewriting machines, the combination of escapement mechanism, a universal bar adapted to actuate said mechanism, printing key levers effective on said universal bar, a space bar, connections independent of said universal bar between said space bar and said escapement mechanism, a gravity lock constantly tending to drop down into position to block said universal bar, a second gravity lock constantly tending to drop into position to block said connections, means normally overcoming both said gravity locks, and devices comprising a contact on the traveling carriage of the machine for rendering said last recited means inoperative.

25. In line lock mechanism for typewriting machines, the combination of escapement mechanism, a universal bar adapted to actuate said mechanism, printing key levers effective on said universal bar, a space bar, connections independent of said universal bar between said space bar and said escapement mechanism, a pair of gravity operated locking devices, one for the universal bar and one for the space bar, a frame normally co-operative with said gravity devices for holding them in inoperative position, and means for rendering said frame inoperative comprising a spring pressed slide, a pivoted bail and a carriage carried contact operative on said bail.

26. In line lock mechanism for typewriting machines, the combination of escapement mechanism, a universal bar adapted to actuate said mechanism, printing key levers effective on said universal bar, a space bar, connections independent of said universal bar between said space bar and said escapement mechanism, a pair of gravity operated locking devices, one for the universal bar and one for the space bar, a frame normally co-operative with said gravity devices for holding them in inoperative position, a traveling carriage, a stop device pivoted thereon, a stationary co-operating stop device, and connections between the carriage carried stop and said frame.

27. In line lock mechanism for typewriting machines, the combination of escapement mechanism, a universal bar adapted to actuate said mechanism, printing key levers effective on said universal bar, a space bar, connections independent of said universal bar between said space bar and said escapement mechanism, a pair of gravity operated locking devices, one for the universal bar and one for the space bar and said escapement mechanism, a pair of gravity operated locking devices, one for the universal bar and one for the space bar, a frame normally co-operative with said gravity devices for holding them in inoperative position, a traveling carriage, a stop device pivoted thereon, a stationary co-operating stop device, and connections between the carriage carried stop and said frame, said connections comprising a bail extending lengthwise of the carriage, a crank arm coaxial with said bail, and a spring pressed slide lock between said crank arm and said frame.

28. In line lock mechanism for typewriting machines, the combination of escapement mechanism, a space bar frame, connections between said space bar frame and said escapement mechanism comprising a lever, a gravity operated stop, preventive means normally holding said stop out of the path of said lever, and means controlled by the traveling carriage of the machine for throwing said preventive means out of action.

29. In line lock mechanism for typewriting machines, the combination of escapement mechanism, printing keys, connections between said printing keys and said escapement mechanism, a space bar, a train of connections independent of said first recited connections between said space bar and said escapement mechanism, a gravity lock for said train of connections, a lock preventer, and devices comprising a contact on the traveling carriage of the machine for rendering said preventer ineffective.

30. In line lock mechanism for typewriting machines, the combination of escapement mechanism, a space bar frame, connections between said space bar frame and said escapement mechanism comprising a lever, a gravity operated stop, a spring pressed frame normally holding said gravity operated stop out of operative position, a spring pressed slide rod effective on said frame, a crank arm acting against said slide rod, a rock shaft to which said crank arm is pivoted, a bail fixed on said rock shaft and extending lengthwise of the traveling carriage, and a contact controlled by said traveling carriage for operating said bail.

31. In line lock mechanism for typewriting machines, the combination of escapement mechanism, printing keys, a space bar, separate trains of mechanism connecting said space bar and said printing keys with said escapement mechanism, line lock devices for locking both said printing keys and said space bar against operation, said line lock mechanism being controlled by a contact device loosely hung on the traveling carriage of the machine and adapted to be cammed into operation.

32. In line-lock release mechanism for typewriting machines, the combination of two co-operating contact devices, one carriage carried and one on the frame of the machine, and key operated means for throwing said devices out of co-operative engagement comprising a lever, a push rod, a pivoted member movable by said push rod, and a second lever movable by said pivoted member.

33. In line lock release mechanism for typewriting machines, the combination of two co-operating contact devices, one carriage carried and one on the frame of the machine, and key operated means for throwing said devices out of co-operative engagement comprising a lever, a push rod, a pivoted member, and a second lever, said second lever being provided with a cam slot having an edge effective to move one of said contact devices and another edge to act as a limiting stop.

34. In line lock release mechanism for typewriting machines, the combination of two co-operating contact devices, one carriage carried and one on the frame of the machine, and key operated means for throwing said devices out of co-operative engagement comprising a lever, a push rod, a pivoted member, and a second lever, said second lever being provided with two cam slots, one of which co-operates with said member to swing said lever and the other of which is effective to move one of said contacts.

35. In line lock release mechanism for typewriting machines, the combination of two co-operating contact devices, one carriage carried and the other pivotally mounted on the frame of the machine, the cam lever effective to swing the latter on its pivot to inoperative position, a pivoted member having a pin and slot cam connection with said lever, a push rod for operating said member, and a key lever connected with said push rod.

36. In line lock release mechanism for typewriting machines, the combination of a pivotally mounted stop bar, an adjustable contact device on said bar, a co-operating contact device, a key lever, and connections between said key lever and said stop bar for swinging the latter on its pivots, said connections comprising a lever of the first order provided with cam devices one at each arm, one of said cam devices being effective on said stop bar to move it when actuated, but being normally disconnected wholly from said stop bar.

37. In line lock release mechanism for typewriting machines, the combination of a pivotally mounted stop bar, an adjustable contact device on said bar, a co-operating contact device, a key lever, connections between said key lever and said stop bar for swinging the latter on its pivots, said connections comprising a lever of the first order provided with cam devices, one at each arm, one of said cam devices being effective on said stop bar, a pivotally mounted member provided with a pin co-operative with the other cam device, and a push rod contactive with said member.

38. In line lock release mechanism for typewriting machines, the combination of a pivotally mounted stop bar, an adjustable contact device on said bar, a co-operating contact device, a key lever, connections between said key lever and said stop bar for swinging the latter on its pivots, said connections comprising a lever of the first order provided with cam devices, one at each arm, one of said cam devices being effective on said stop bar, a pivotally mounted member provided with a pin co-operative with the other cam device, a push rod contactive with said member, and a guide with which said push rod slidably engages near its contact end, the other end of said push rod being pivotally connected with said key lever.

Signed at the borough of Manhattan, city of New York, in the county of New York and State of New York, this 6th day of Oct. A. D. 1921.

JOHN H. BARR.
EDWIN E. BARNEY.

Witnesses:
CHARLES E. SMITH,
E. M. WELLS.